US012521983B2

(12) United States Patent
Fujii

(10) Patent No.: US 12,521,983 B2
(45) Date of Patent: Jan. 13, 2026

(54) HEAD SUBSTRATE, LIQUID DISCHARGE HEAD, AND LIQUID DISCHARGE APPARATUS

(71) Applicant: CANON KABUSHIKI KAISHA, Tokyo (JP)

(72) Inventor: Yasuo Fujii, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 18/197,989

(22) Filed: May 16, 2023

(65) Prior Publication Data

US 2023/0405989 A1 Dec. 21, 2023

(30) Foreign Application Priority Data

Jun. 15, 2022 (JP) ................................ 2022-096750

(51) Int. Cl.
*B41J 2/125* (2006.01)
*B41J 2/045* (2006.01)

(52) U.S. Cl.
CPC ....... *B41J 2/04563* (2013.01); *B41J 2/04541* (2013.01); *B41J 2/125* (2013.01)

(58) Field of Classification Search
CPC ..... B41J 2/04563; B41J 2/04541; B41J 2/125
See application file for complete search history.

(56) References Cited

U.S. PATENT DOCUMENTS

| | | | |
|---|---|---|---|
| 7,441,859 B2 | 10/2008 | Hayasaki | |
| 10,427,400 B2 | 10/2019 | Yamato et al. | |
| 10,960,665 B2 | 3/2021 | Nomura et al. | |
| 2006/0139383 A1 | 6/2006 | Hayasaki | |
| 2016/0009078 A1* | 1/2016 | Nagatsuka | B41J 2/0454 347/17 |
| 2018/0194133 A1 | 7/2018 | Yamato et al. | |
| 2019/0299600 A1 | 10/2019 | Nomura et al. | |

FOREIGN PATENT DOCUMENTS

| | | |
|---|---|---|
| JP | 2003-39677 A | 2/2003 |
| JP | 2006-181760 A | 7/2006 |
| JP | 2018-111306 A | 7/2018 |
| JP | 2019-171670 A | 10/2019 |
| JP | 2020-23077 A | 2/2020 |
| JP | 2020-138465 A | 9/2020 |

* cited by examiner

*Primary Examiner* — Lam S Nguyen
(74) *Attorney, Agent, or Firm* — VENABLE LLP

(57) ABSTRACT

A head substrate including a liquid discharge element for discharging a liquid, the head substrate comprising a functional unit configured to realize a predetermined function, and a communication input unit to which communication data is to be inputted, wherein the communication data includes a first portion for setting a function of the functional unit and a second portion for controlling a supply of current to the functional unit.

9 Claims, 18 Drawing Sheets

FIG. 2B

137

| BIT | NAME | CONTENT (WHEN 1 IS SET IN EACH BIT) |
|---|---|---|
| 7 | flag7 | EXECUTE DIGITAL TEMPERATURE DETECTION |
| 6 | flag6 | EXECUTE DISCHARGE DETECTION |
| 5 | – | – |
| 4 | flag4 | NOT TRANSMIT "VARIOUS DIGITAL TEMPERATURE DETECTION SETTINGS" |
| 3 | flag3 | NOT TRANSMIT "VARIOUS DISCHARGE DETECTION SETTINGS" |
| 2 | flag2 | NOT TRANSMIT "DIGITAL OUTPUT SELECTION" |
| 1 | flag1 | NOT TRANSMIT "ANALOG OUTPUT SELECTION" |
| 0 | flag0 | NOT TRANSMIT "SUB-HEATER SELECTION" |

FIG. 12

137

| BIT | NAME | CONTENT (WHEN 1 IS SET IN EACH BIT) |
|---|---|---|
| 7 | flag70 | NOT TRANSMIT "SUB-HEATER SELECTION" |
| 6 | flag6 | EXECUTE DISCHARGE DETECTION,<br>EXECUTE DIGITAL TEMPERATURE DETECTION |
| 5 | – | – |
| 4 | flag4 | NOT TRANSMIT "VARIOUS DIGITAL TEMPERATURE DETECTION SETTINGS" |
| 3 | flag3 | NOT TRANSMIT "VARIOUS DISCHARGE DETECTION SETTINGS" |
| 2 | flag2 | NOT TRANSMIT "DIGITAL OUTPUT SELECTION" |
| 1 | flag1 | NOT TRANSMIT "ANALOG OUTPUT SELECTION" |
| 0 | flag0 | NOT TRANSMIT "SUB-HEATER SELECTION" |

FIG. 14A

137

| BIT | NAME | CONTENT (WHEN 1 IS SET IN EACH BIT) |
|---|---|---|
| 7 | flag71 | NOT TRANSMIT "SUB-HEATER SELECTION" |
| 6 | flag61 | NOT TRANSMIT "HEAT PULSE SETTING" |
| 5 | — | — |
| 4 | flag4 | NOT TRANSMIT "VARIOUS DIGITAL TEMPERATURE DETECTION SETTINGS" |
| 3 | flag3 | NOT TRANSMIT "VARIOUS DISCHARGE DETECTION SETTINGS" |
| 2 | flag2 | NOT TRANSMIT "DIGITAL OUTPUT SELECTION" |
| 1 | flag1 | NOT TRANSMIT "ANALOG OUTPUT SELECTION" |
| 0 | flag0 | NOT TRANSMIT "SUB-HEATER SELECTION" |

FIG. 14B

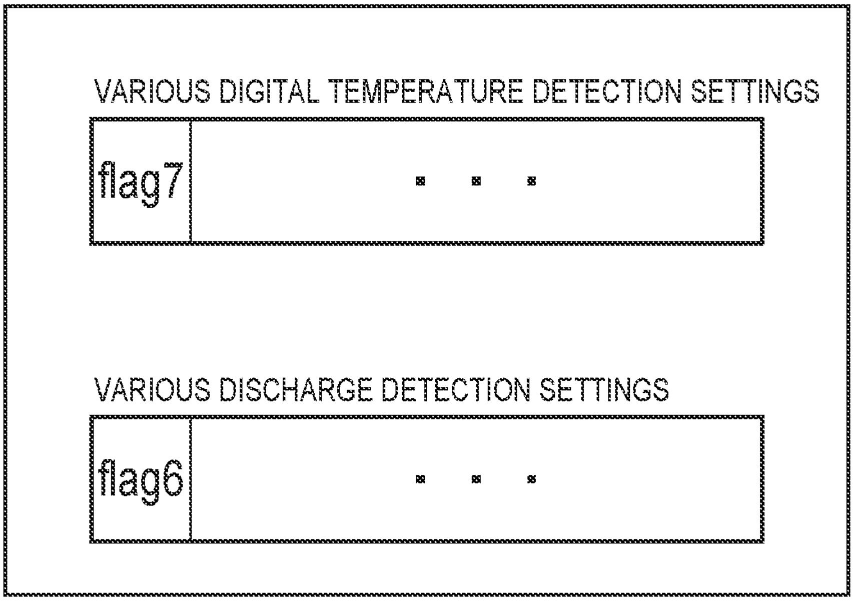

HEAD SUBSTRATE, LIQUID DISCHARGE HEAD, AND LIQUID DISCHARGE APPARATUS

BACKGROUND OF THE INVENTION

Field of the Invention

The present invention relates mainly to ahead substrate.

Description of the Related Art

A head substrate provided in a printhead that an inkjet printing apparatus includes may include an analog circuit, such as a bias circuit, an operational amplifier, or the like, to which current is continuously supplied while a power supply voltage is being supplied. Therefore, with the recent multi-functionalization of head substrates, power consumption tends to increase.

Japanese Patent Laid-Open No. 2018-111306 discloses a technique for reducing power consumption by causing an analog circuit to enter a stopped state. However, in a configuration of Japanese Patent Laid-Open No. 2018-111306, it is necessary to install in the head substrate a dedicated electrode for control for causing the analog circuit to enter a stopped state in addition to electrodes for signal input and output, and thus, there is room for improvement in terms of simplification of the configuration of the head substrate.

SUMMARY OF THE INVENTION

The present invention provides a technique that is advantageous for realizing reduction of power consumption of a head substrate with a relatively simple configuration.

One of the aspects of the present invention provides a head substrate including a liquid discharge element for discharging a liquid, the head substrate comprising a functional unit configured to realize a predetermined function, and a communication input unit to which communication data is to be inputted, wherein the communication data includes a first portion for setting a function of the functional unit and a second portion for controlling a supply of current to the functional unit.

Further features of the present invention will become apparent from the following description of exemplary embodiments (with reference to the attached drawings).

BRIEF DESCRIPTION OF THE DRAWINGS

FIG. 2B is an example of a data format of a flag 137.

FIG. 12 is another example of a data format of the flag 137.

FIG. 14A is another example of a data format of the flag 137.

FIG. 14B is another example of a format of the communication data 147 of the head substrate 100.

DESCRIPTION OF THE EMBODIMENTS

Figure 1:
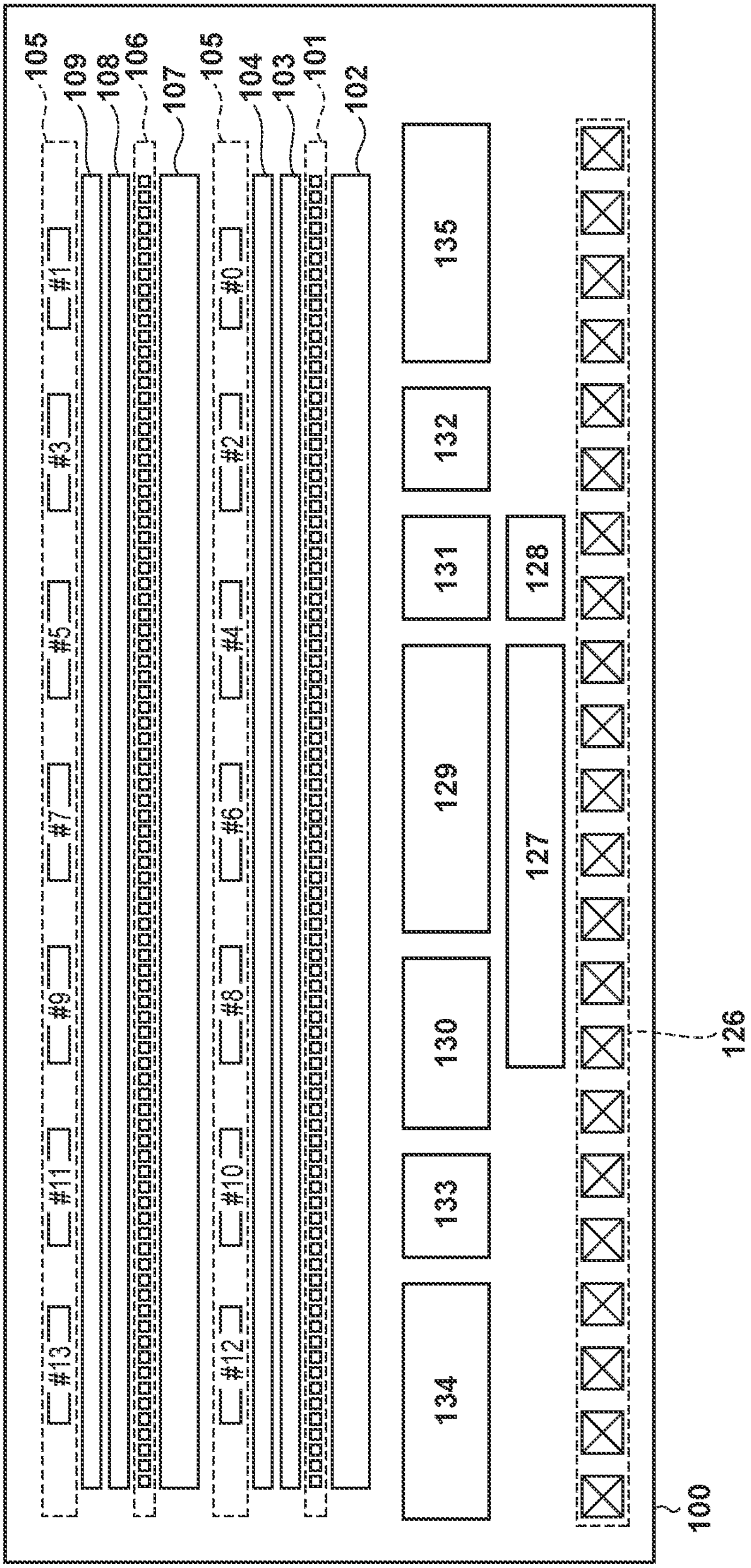
FIG. 1 is a schematic diagram illustrating an example of a configuration of ahead substrate 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic diagram illustrating an example of a configuration of a head substrate 100 in an inkjet printhead according to a first embodiment. The head substrate 100 includes first row heaters 101, a first row heater selection driving unit 102, first row discharge detection sensors 103, and a first row discharge detection sensor selection unit 104.

The first row heaters 101 may be formed by a plurality of heaters (electrothermal conversion elements) being arranged in a side direction of the head substrate 100. A desired heater in the first row heaters 101 is selected by the first row heater selection driving unit 102 and is heated by driving control of a driver (not illustrated), and thereby ink is discharged from a discharge port. The first row discharge detection sensors 103 are arranged in a vicinity of the first row heaters 101, and the ink discharge is detected by a corresponding sensor being selected by the first row discharge detection sensor selection unit 104.

The components 102 to 104 may be arranged along a row direction of the first row heaters 101 (a direction in which the plurality of heaters are arranged).

Similarly, the head substrate 100 includes second row heaters 106, a second row heater selection driving unit 107, second row discharge detection sensors 108, and a second row discharge detection sensor selection unit 109, and functions of the components 106 to 109 correspond to functions of the components 101 to 104, respectively.

The head substrate 100 further includes a group of diodes 105 to realize, as one of the purposes, the above-described ink discharge within an appropriate temperature range. The group of diodes 105 includes a plurality of diodes (illustrated as #0 to #13 in the drawing) and is assumed to be capable of detecting temperature based on the amount of dark current generated in a state in which a predetermined bias is applied to the individual diodes.

The individual diodes may be expressed as temperature detection elements, and the group of diodes 105 may be expressed as a group of temperature detection elements, a group of temperature sensors, and the like. The group of diodes 105 may be arranged along the row direction of the first row heaters 101 (the direction in which the plurality of heaters are arranged).

The head substrate 100 further includes a group of electrodes 126. The group of electrodes 126 includes a plurality of electrodes (pads) for receiving a power supply voltage or a ground voltage or for inputting and outputting a control signal or a driving signal. The group of electrodes 126 may be arranged along the row direction of the first row heaters 101 (the direction in which the plurality of heaters are arranged).

The head substrate 100 further includes a communication input unit 127, a communication output unit 128, a control unit 129, a heat pulse generation unit 130, a sub-heater selection driving unit 131, an analog output selection unit 132, a digital output selection unit 133, a discharge detection unit 134, and a digital temperature detection unit 135. The components 127 to 135 are circuit units that may be formed by active elements including switch elements, such as bipolar transistors and MOS transistors, and passive elements including resistive elements, capacitive elements, and the like.

The communication input unit 127 receives an input signal for the head substrate 100 via the group of electrodes 126. The communication output unit 128 outputs an output signal from the head substrate 100 via the group of electrodes 126. The control unit 129 performs driving control of each component of the head substrate 100 based on a signal inputted to the communication input unit 127.

The heat pulse generation unit 130 generates a driving pulse (heat pulse) to be supplied to the driver (not illustrated) in the first row heater selection driving unit 102 based on an instruction signal of the control unit 129.

The sub-heater selection driving unit 131 selectively drives a sub-heater (not illustrated) based on an instruction signal of the control unit 129 such that the head substrate 100 is within an appropriate temperature range.

The analog output selection unit 132 selects a monitor output of an analog circuit (not illustrated) based on an instruction signal of the control unit 129 and, for example, selects any one diode from the group of diodes 105. Similarly, the digital output selection unit 133 selects a monitor output of a digital circuit (not illustrated) based on an instruction signal of the control unit 129.

The discharge detection unit 134 determines a presence or absence of discharge based on an output of one sensor selected from among the first row discharge detection sensors 103 and the second row discharge detection sensors 108 based on an instruction signal of the control unit 129. A signal indicating a result of the determination is outputted from the group of electrodes 126 by the communication output unit 128.

The digital temperature detection unit 135 converts from analog to digital a current value generated in one diode selected from the group of diodes 105 based on an instruction signal of the control unit 129, and a signal obtained thereby is outputted from the group of electrodes 126 by the communication output unit 128.

Figure 2A:
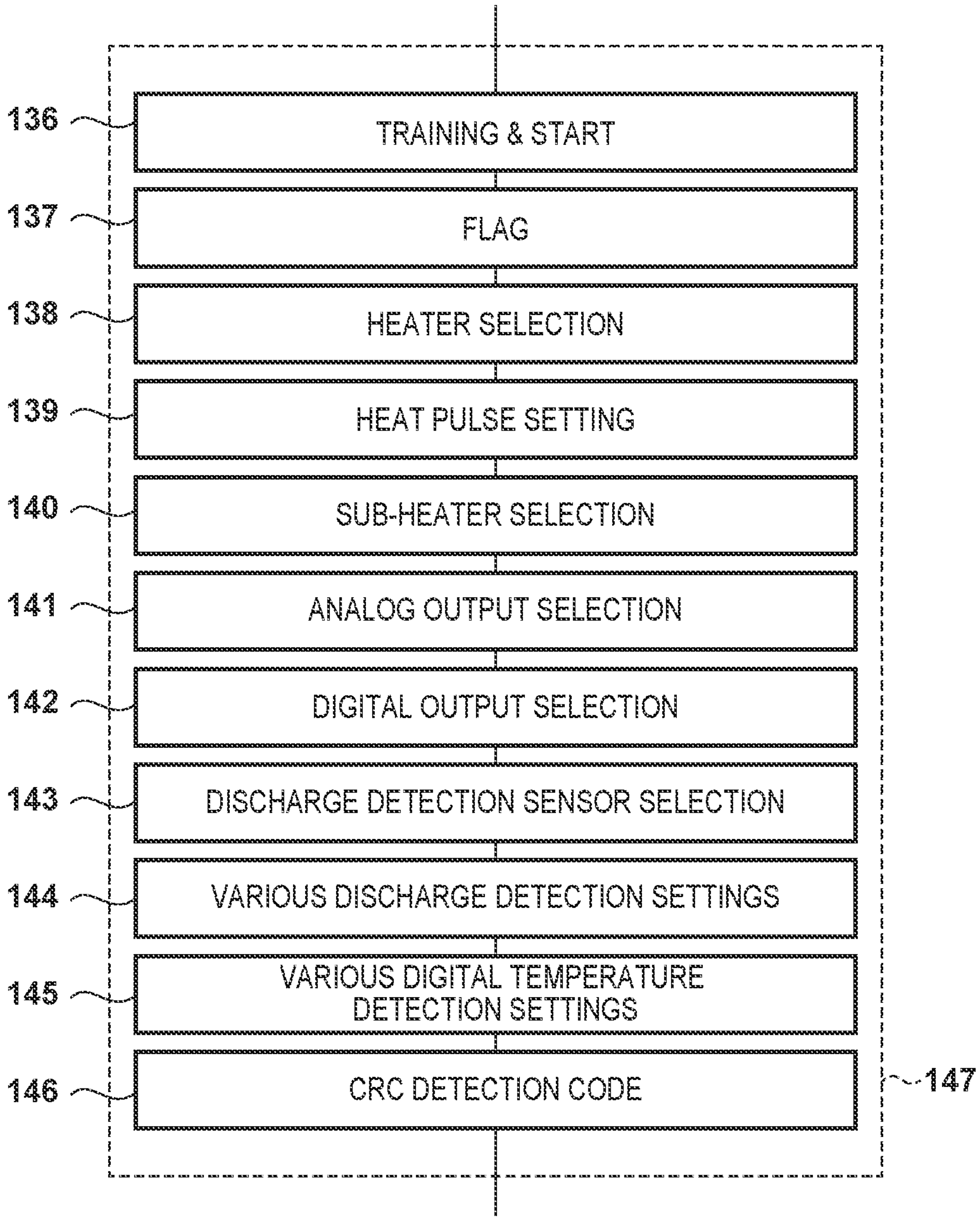
FIG. 2A is an example of a format of communication data 147 of the head substrate 100.

FIG. 2A illustrates an example of a format of communication data 147 of the head substrate 100 according to the present embodiment. The communication data 147 includes a plurality of types of data 136 to 146. The data 136 indicates a start of training & start (illustrated as the training & start 136). The data 137 sets execution of some functions and non-transmission of some communication data (illustrated as the flag 137). The data 138 specifies heaters selected by the first row heater selection driving unit 102 and the second row heater selection driving unit 107 (illustrated as the heater selection 138). The data 139 specifies a driving pulse of the drivers (not illustrated) in the first row heater selection driving unit 102 and the second row heater selection driving unit 107 (illustrated as the heat pulse setting 139). The data 140 specifies a selection from among the sub-heaters (not illustrated) (illustrated as the sub-heater selection 140).

The data 141 is a selection from the group of diodes 105 and specifies a selection for a monitor output of the analog circuit (not illustrated) (illustrated as the analog output selection 141). The data 142 specifies a selection for a monitor output of the digital circuit (not illustrated) (illustrated as the digital output selection 142). The data 143 specifies a first row discharge detection sensor 103 and a second row discharge detection sensor 108 selected by the first row discharge detection sensor selection unit 104 and the second row discharge detection sensor selection unit 109, respectively, (illustrated as the discharge detection sensor selection 143). The data 144 specifies circuit correction and the like of the discharge detection unit 134 (illustrated as the various discharge detection settings 144). The data 145 specifies circuit correction and the like of the digital temperature detection unit 135 (illustrated as the various digital temperature detection settings 145).

The data 146 specifies a cyclic redundancy check (CRC) computation value for data from the flag 137 to the various digital temperature detection settings 145 (illustrated as the CRC detection code 146). When the CRC computation value computed by the control unit 129 and the CRC detection code 146 coincide, it can be determined that the communication data 147 has been correctly received.

FIG. 2B illustrates an example of a data format of the flag 137. The flag 137 is constituted by bits #0 to #7, and for example, when 1 is set in flag7, which is bit #7, digital temperature detection may be performed, and when 1 is set in flag6, which is bit #6, discharge detection may be performed. When 1 is set in flag4, which is bit #4, communication data of the various digital temperature detection settings 145 is not transmitted. When 1 is set in flag3, which is bit #3, communication data of the various discharge detection settings 144 is not transmitted. When 1 is set in flag2, which is bit #2, communication data of the digital output selection 142 is not transmitted. When 1 is set in flag1, which is bit #1, communication data of the analog output selection 141 is not transmitted. When 1 is set in flag0, which is bit #0, communication data of the sub-heater selection 140 is not transmitted.

Figure 3:
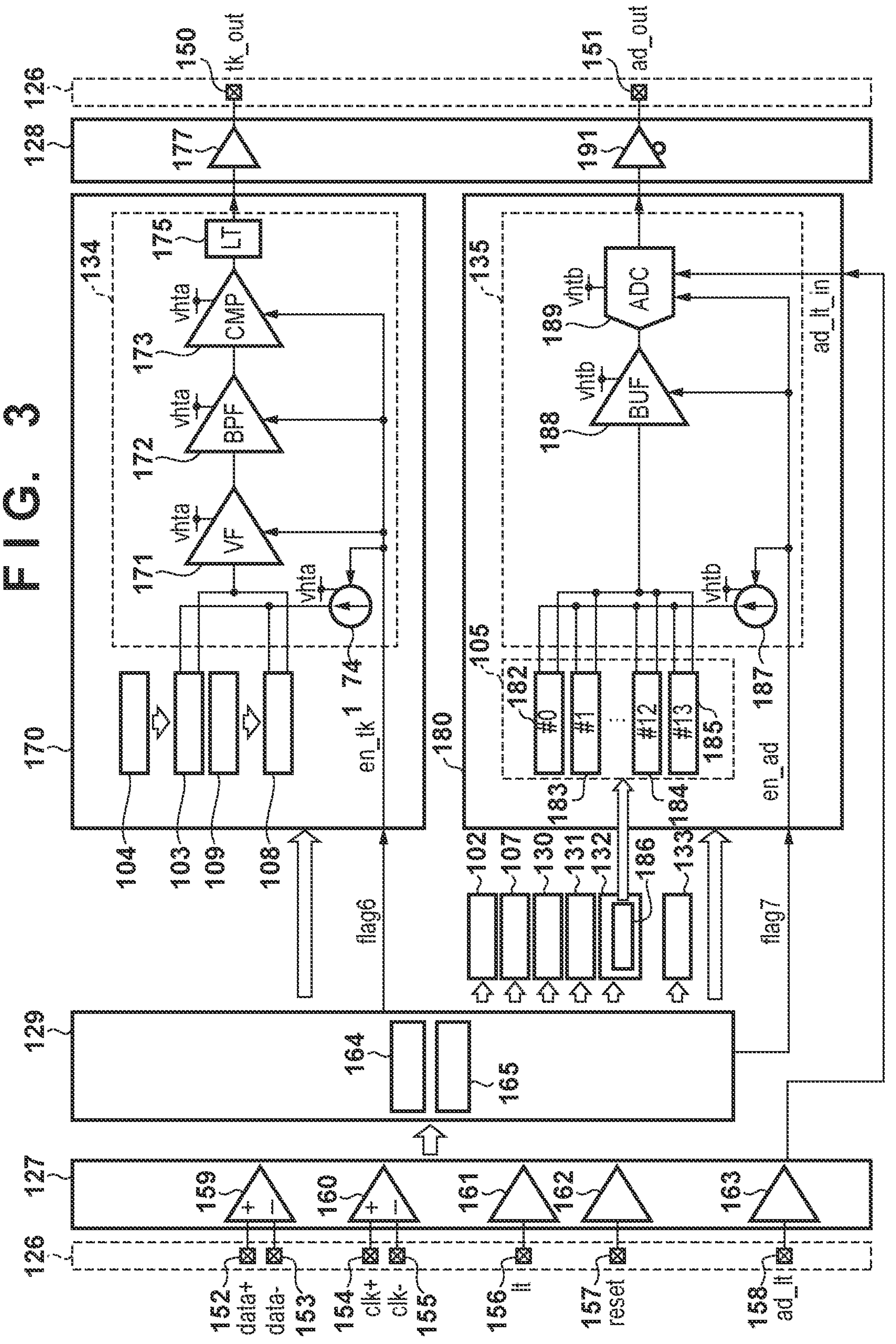
FIG. 3 is a block diagram illustrating an example of a configuration of the head substrate 100.

FIG. 3 is a block diagram illustrating details of an example of a configuration of the head substrate 100 according to the present embodiment. The group of electrodes 126 includes an electrode 152 of a signal (data+), an electrode 153 of a signal (data−), an electrode 154 of a signal (clk+), an electrode 155 of a signal (clk−), an electrode 156 of a signal (lt), an electrode 157 of a signal (reset), and an electrode 158 of a signal (ad_lt), where the signals are input signals to be received by the communication input unit 127. Although details will be described later, the group of electrodes 126 further includes an electrode 150 of a signal (tk_out) and an electrode 151 of a signal (ad_out), where the signals are output signals to be outputted by the communication output unit 128.

The signal (data+) and the signal (data−) are low voltage differential signaling (LVDS) differential signals and are inputted to an LVDS receiver 159.

Similarly, the signal (clk+) and the signal (clk−) are inputted to an LVDS receiver 160.

The signal (lt) is a latch signal for the communication data 147. The signal (reset) is an initialization signal for the head substrate 100. The signal (ad_lt) is a latch signal for an analog-to-digital converter (ADC) 189 of the digital temperature detection unit 135. The signal (lt), the signal (reset) and the signal (ad_lt) are inputted to an input buffer 161, an input buffer 162, and an input buffer 163, respectively.

A flag analysis unit 164 of the control unit 129 analyzes each bit of the flag 137 of the communication data 147 based on the signals from the LVDS receivers 159 and 160 and the input buffers 161 and 162. In the analysis, it is determined, for example, whether to execute digital temperature detection and discharge detection as well as whether communication data for the various digital temperature detection settings 145, the various discharge detection settings 144, the digital output selection 142, the analog output selection 141, and the sub-heater selection 140 is communicated. A CRC determination unit 165 determines whether a CRC computation value of the communication data 147 and the CRC detection code 146 coincide.

A discharge detection circuit unit 170 in the drawing may be formed by the discharge detection unit 134, the first row discharge detection sensor selection unit 104, the first row discharge detection sensors 103, the second row discharge detection sensor selection unit 109, and the second row discharge detection sensors 108. flag6 may be inputted to the discharge detection circuit unit 170 as an enable signal (en_tk).

A digital temperature detection circuit unit 180 in the drawing may be formed by the digital temperature detection unit 135 and the group of diodes 105. flag7 may be inputted to the digital temperature detection circuit unit 180 as an enable signal (en_ad).

The discharge detection unit 134 includes a voltage follower circuit (VF) 171, a band-pass filter circuit (BPF) 172, a comparator circuit (CMP) 173, a constant current circuit 174, and a latch circuit (LT) 175. These analog circuits may function based on the enable signal (en_tk) while a supply voltage of a 5V power supply vhta is being supplied. For example, when the enable signal (en_tk) is at a high (H) level, bias circuits of the analog circuits are activated by a current supplied from the power supply vhta.

An output current of the constant current circuit 174 is supplied to a first row discharge detection sensor 103 and a second row discharge detection sensor 108 selected by the first row discharge detection sensor selection unit 104 and the second row discharge detection sensor selection unit 109. Outputs of the first row discharge detection sensor 103 and the second row discharge detection sensor 108 are inputted to the VF 171 and impedance conversion is performed on the outputs. An output of the VF 171 is inputted into the BPF 172, and a signal that has been filtered for a predetermined frequency band (for which a specific waveform at the time of ink discharge has been detected) is inputted into the CMP 173. In response to this, the CMP 173 outputs a result of comparison with a discharge detection threshold voltage to the LT 175. The LT 175 latches the comparison result of the CMP 173 based on an instruction from the control unit 129. A discharge detection determination result thus obtained by the discharge detection circuit unit 170 is outputted from an output buffer 177 as the signal (tk_out).

The group of diodes 105 includes diodes 182 to 185 (corresponding to #0 to #13, respectively, of FIG. 1), and a diode selection circuit unit 186 of the analog output selection unit 132 selects an arbitrary diode from the group of diodes 105.

The digital temperature detection unit 135 includes a buffer circuit (BUF) 188, the ADC 189, and a constant current circuit 187 and may function based on the enable signal (en_ad) while a power supply voltage of a 5V power supply vhtb is being supplied. For example, when the enable signal (en_ad) is at an H level, a bias circuit of the analog circuit is activated by a current supplied from the power supply vhtb.

An output current of the constant current circuit 187 is supplied to a diode selected from the group of diodes 105 by the diode selection circuit unit 186. An output voltage (monitor voltage) of that diode is amplified by the BUF 188 and converted from analog to digital by the ADC 189. Assume that the ADC 189 is a successive approximation ADC that converts an analog signal into a 9-bit digital signal from bits #0 to #8. An analog-to-digital converted value of the monitor voltage of the diode thus obtained by the digital temperature detection circuit unit 180 is outputted as the signal (ad_out) from an output buffer 191.

Figure 4:
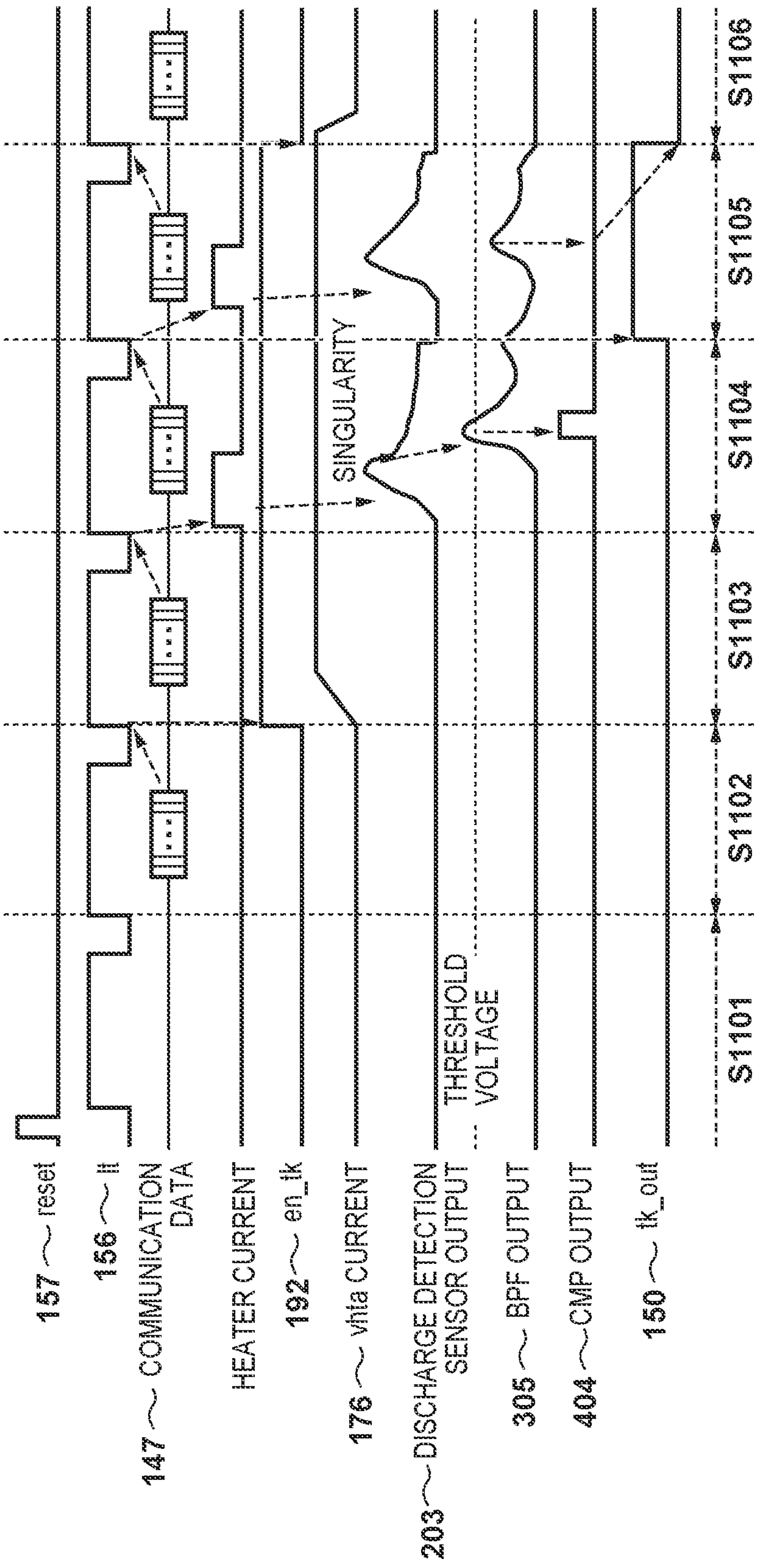
FIG. 4 is a timing chart illustrating an example of contents of driving control in the head substrate 100.

FIG. 4 is a timing chart illustrating an example of contents of driving control in the head substrate 100. In step S1101, the head substrate 100 is initialized by the signal (reset) entering an H level. In step S1102, flag6 of the communication data 147 is set to 1, and thereby desired values are set in the various discharge detection settings 144. Thereafter, in response to a rising edge of the signal (lt), the signal (en_tk) enters an H level, and thereby the supply of current from the power supply vhta is started.

In step S1103, 1 is set in flag6 of the communication data 147, and thereby, a heater to be driven in step S1104 and a heat pulse are set in the heater selection 138 and the heat pulse setting 139, respectively. In addition, a corresponding discharge detection sensor is set in the discharge detection sensor selection 143. The various discharge detection settings 144 are not changed, and so 1 is set in flag3 so as not to transmit data.

In step S1104, a heater current is supplied to the heater set in step S1103, and thereby, a temperature change occurs in a vicinity of the heater, and a signal whose waveform is based on the temperature change is outputted from the set discharge detection sensor to a discharge detection sensor output unit 203. A signal based on this waveform and filtered by the BPF 172 so as to allow detection of a specific waveform at the time of ink discharge is outputted to a BPF output unit 305. When a singularity is detected, the CMP 173 outputs to a CMP output unit 404 an H level indicating that discharge is detected across a period in which a value of the signal exceeds a threshold voltage. Thereafter, in response to a rising edge of the signal (lt), an H level signal (tk_out) is outputted.

In addition, in step S1104, 1 is set in flag6 of the communication data 147, and thereby, a heater to be driven in step S1105 and a heat pulse are set in the heater selection 138 and the heat pulse setting 139, respectively. In addition, a corresponding discharge detection sensor is set in the discharge detection sensor selection 143. 1 is set in flag3, so as not to transmit the various discharge detection settings 144.

In step S1105, a heater current is supplied to the heater set in step S1104, and thereby, a temperature change occurs in a vicinity of the heater, and a signal whose waveform is based on the temperature change is outputted from the set discharge detection sensor to the discharge detection sensor output unit 203. In this waveform, a singularity of a specific waveform at the time of ink discharge is not detected by filtering in the BPF 172, and so, a low (L) level indicating that discharge is not detected is outputted to the CMP output unit 404. Thereafter, in response to a rising edge of the signal (lt), an L level signal (en_tk) is outputted, and thereby suppression of current output from the power supply vhta is started.

Assume that in step S1106, a series of discharge detection operations ends. Although an aspect of performing a discharge detection operation for two heaters has been described for the sake of descriptive simplicity, this may be performed for all of the heaters or may be performed only for heaters that are actually used in a printing operation.

Figure 16:
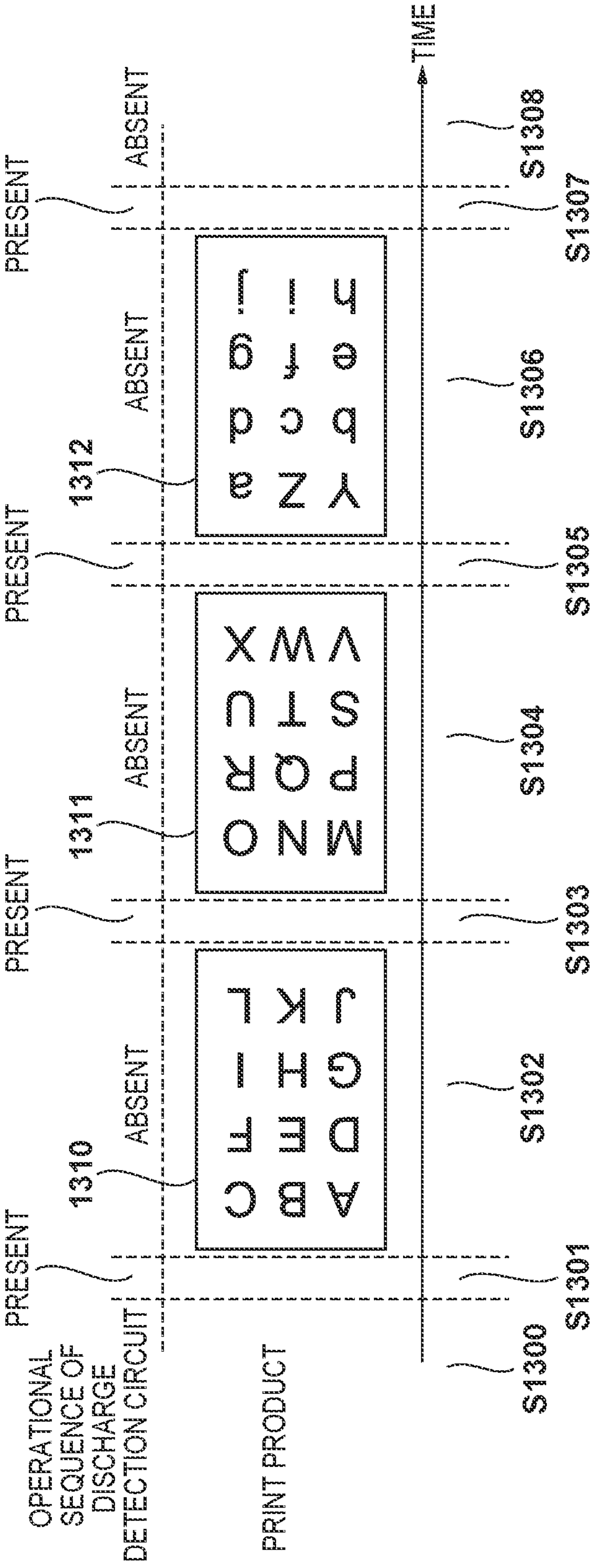
FIG. 16 is a schematic diagram for explaining an example of a discharge detection operation.

FIG. 16 is a schematic diagram for explaining the discharge detection operation described with reference to FIG. 4, with a horizontal axis as a time axis. Here, a description will be given using print products 1310, 1311, and 1312.

When a print instruction is inputted in a standby state in step S1300, a discharge detection operation is executed in step S1301, and heaters for which discharge is not detected may be detected.

In step S1302, alternative heaters for which discharge is not detected are driven, and thereby the print product 1310 is generated. In order to prevent a discharge effect from being produced in conjunction with a rise in temperature in a vicinity of the heaters to which current has been supplied, the discharge detection operation is prevented from being executed.

In step S1303 to step S1306, processing similar to that of steps S1301 and S1302 is performed so that the print products 1311 and 1312 are each generated. In step S1307, a series of printing operations is completed, and a discharge detection operation is executed in preparation for the next printing instruction.

In the present example, it is assumed that a discharge detection operation is executed in steps S1301, S1303, S1305 and S1307; however, as another example, a discharge detection operation may be executed only in step S1301 (only prior to the beginning of a series of print operations). Furthermore, a discharge detection operation may be performed when a nozzle check pattern for determining whether ink is appropriately discharged from the nozzles of the inkjet printhead is printed.

Figure 5:
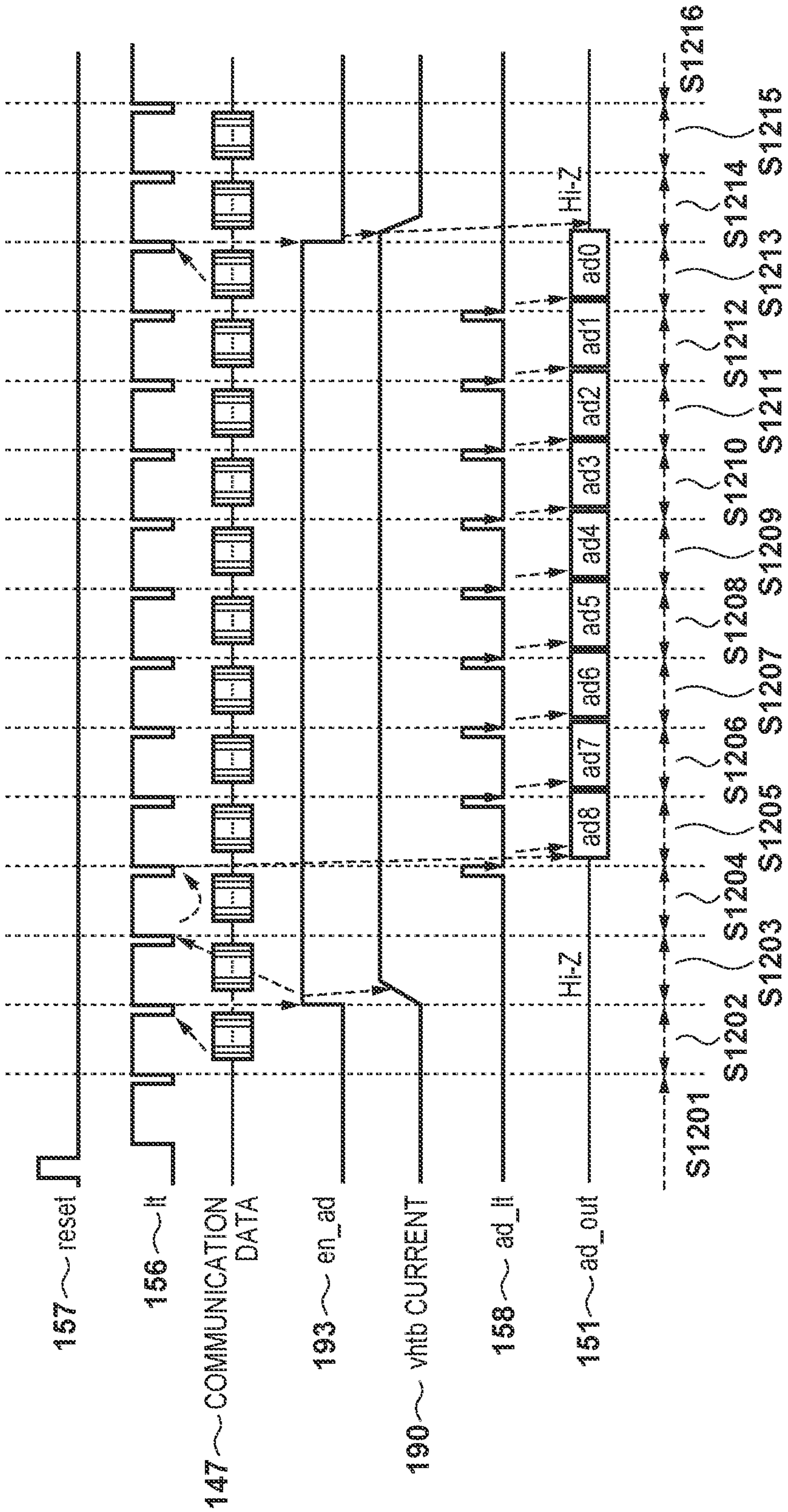
FIG. 5 is a timing chart illustrating an example of contents of operation in a digital temperature detection circuit unit 180.

FIG. 5 is a timing chart illustrating an example of contents of operation in the digital temperature detection circuit unit 180 of FIG. 3.

In step S1201, the head substrate 100 is initialized by the signal (reset) entering an H level. In step S1202, flag7 of the communication data 147 is set to 1, one diode (here, the diode 182 (#0)) for performing digital temperature detection is set in the analog output selection 141 from the group of diodes 105, and a desired value is set in the various digital temperature detection settings 145. Thereafter, in response to a rising edge of the signal (lt), the signal (en_ad) enters an H level, and thereby the supply of current from the power supply vhtb is started.

In step S1203, 1 is set in flag7 of the communication data 147. Further, the setting values are not changed for the analog output selection 141 and the various digital temperature detecting settings 144, and so, 1 is set in flag4 and flag1 so as not to transmit data. Thereafter, up until step S1213, the communication data 147 is maintained. Further, in step S1203, a current is supplied from the constant current circuit 187 to the diode 182 (#0) set in step S1202, and an output voltage (monitor voltage) at that time is inputted to the ADC 189 via the BUF 188.

In step S1204, flag7 communicated in step S1202 causes the signal (ad_out) to transition from a Hi-Z state to an H level or an L level in response to a second rising edge of the signal (lt). In response to a falling edge of the signal (ad_lt), in step S1205, a computation result of the ADC 189 (illustrated as "ad8" in the drawing) is outputted as the signal (ad_out).

In a similar procedure, from step S1206 to step S1213, the remaining bits (illustrated as "ad7" to "ad0" in the drawing) are outputted as results of sequential conversion by the ADC 189 in response to a falling edge of the signal (ad_lt).

In step S1213, the signal (en_ad) enters an L level in response to a rising edge of the signal (lt) by 0 being set in flag7 of the communication data 147, and thereby, the current supply from the power supply vhtb is suppressed, and the signal (ad_out) enters a Hi-Z state.

Here, in the operation sequence of the digital temperature detection circuit unit 180, there is no rise in temperature in a vicinity of the heater caused by a current of the digital temperature detection circuit unit 180 unlike in the operation sequence of the discharge detection circuit unit 170, and so, the operation sequence of the digital temperature detection circuit unit 180 can be executed even during generation of a print product.

Figure 6A:
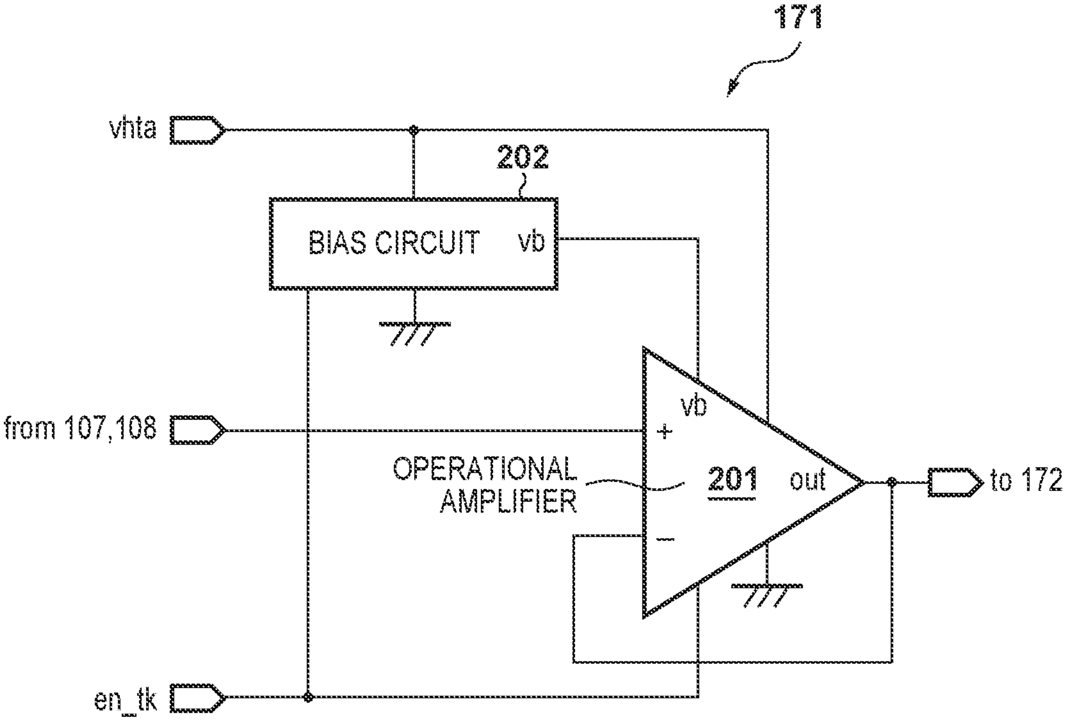
FIG. 6A is an example of a configuration of a voltage follower circuit 171.

FIG. 6A illustrates an example of a configuration of the VF 171 of FIG. 3. The VF 171 includes an operational amplifier 201 and a bias circuit 202.

The operational amplifier 201 and the bias circuit 202 are supplied with a power supply voltage of the power supply vhta. The operational amplifier 201 and the bias circuit 202 operate based on the enable signal (en_tk). An output terminal of the operational amplifier 201 is connected to one input terminal (−), and a signal from a first row discharge detection sensor 103 and a second row discharge detection sensor 108 is inputted to the other input terminal (+). A bias voltage Vb generated by the bias circuit 202 is supplied to the operational amplifier 201. While the bias voltage Vb is not supplied, the operational amplifier 201 is in a non-operating state even if a power supply voltage of the power supply vhta is supplied, and thereby, power consumption can be reduced.

Figure 6B:
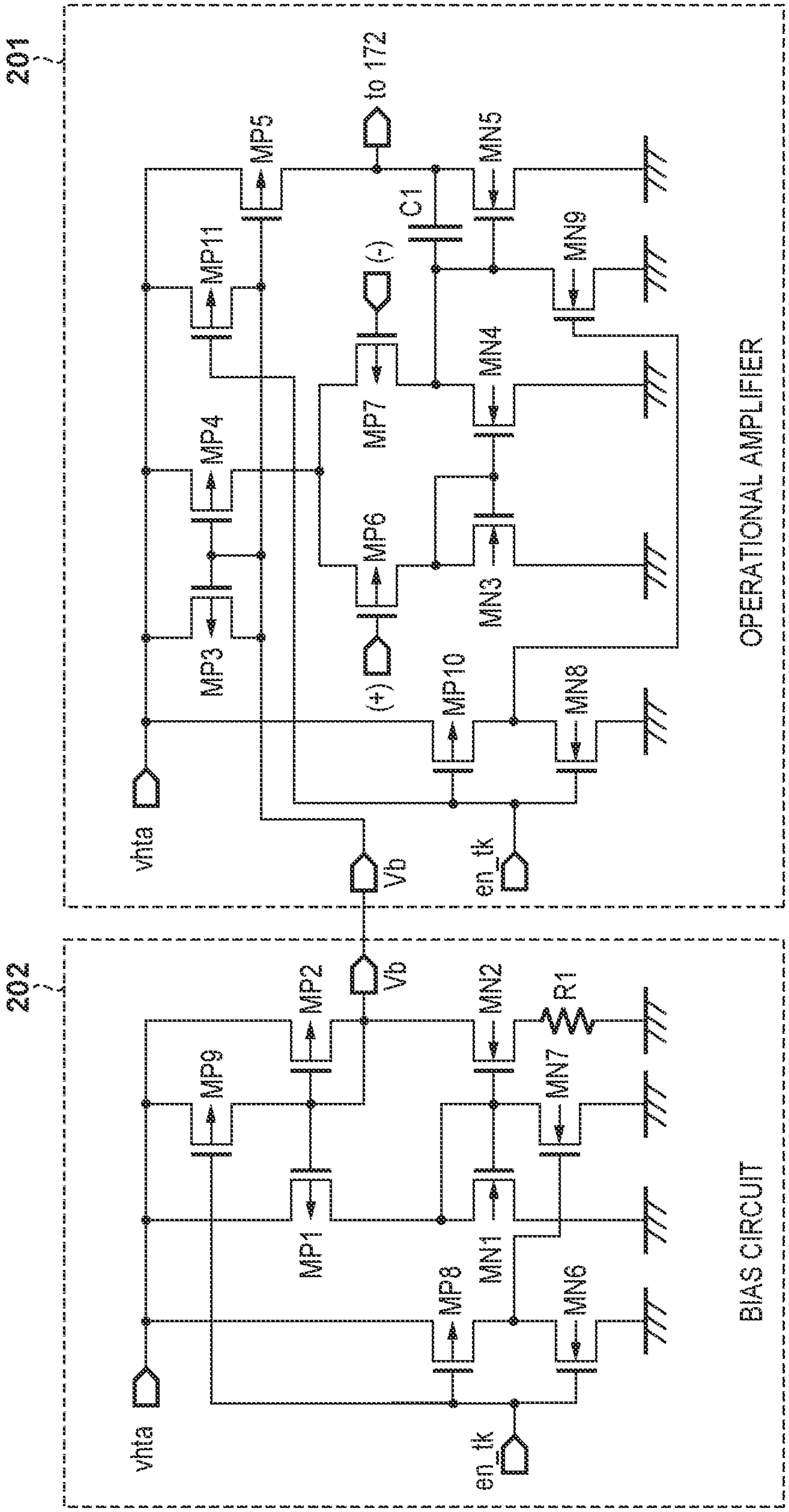
FIG. 6B is an example of configurations of an operational amplifier 201 and a bias circuit 202.

FIG. 6B illustrates an example of a detailed configuration of each of the operational amplifier 201 and the bias circuit 202. MNx (x is a number) in the drawing indicates an NMOS transistor, and MPx (x is a number) indicates a PMOS transistor. Further, R1 indicates a resistive element, and C1 indicates a capacitive element.

Gates of transistors MP1 and MP2 are connected to a drain of a transistor MP9, and the power supply vhta is connected to a source of the transistor MP9.

Gates of transistors MP3, MP4, and MP5 are connected to the drain of the transistor MP9, and the power supply vhta is connected to a source of a transistor MP11. Gates of transistors MN1 and MN2 are connected to a drain of a transistor MN7, and a source of the transistor MN7 is grounded. A gate of a transistor MN5 is connected to a drain of a transistor MN9, and a source of the transistor MN9 is grounded.

The transistors MP9 and MN7 switch the bias circuit 202 between an operating state and a stopped state. The transistors MP11 and MN9 switch the operational amplifier 201 between an operating state and a stopped state. The signal (en_tk) is inputted to gates of the transistors MP9 and MP11. An output of an inverter formed by transistors MP8 and MN6 is connected to a gate of the transistor MN7. The signal (en_tk) is inputted to a gate of this inverter. Similarly, an output of an inverter formed by transistors MP10 and MN8 is connected to a gate of the transistor MN9. The signal (en_tk) is inputted to a gate of this inverter.

When an L level signal (en_tk) is inputted, the transistors MP9 and MP11 enter an on state. Thus, the transistors MP1 to MP5 enter an off state by an H level (a power supply voltage of the power supply vhta) being inputted to their gates. In addition, the transistors MN7 and MN9 enter an on state. Thus, the transistors MN1, MN2, and MN5 enter an off state by an L level (a ground voltage) being inputted to their gates. Therefore, the operational amplifier 201 and the bias circuit 202 enter a non-operating state, and the current supply from the power supply vhta is suppressed.

With this configuration, the signal (en_tk) is able to cause the operational amplifier 201 and the bias circuit 202 to enter a disabled state/stopped state when the signal is in an L level and is able to cause the operational amplifier 201 and the bias circuit 202 to enter an enabled state/operating state when the signal is in an H level. Also, a time it takes to activate the operational amplifier 201 and the bias circuit 202 by a signal level switchover of the signal (en_tk) while a power supply voltage of the power supply vhta is being supplied to the operational amplifier 201 and the bias circuit 202 may be shorter than a time it takes to activate the operational amplifier 201 and the bias circuit 202 by supplying a power supply voltage of the power supply vhta to the operational amplifier 201 and the bias circuit 202.

Figure 7:
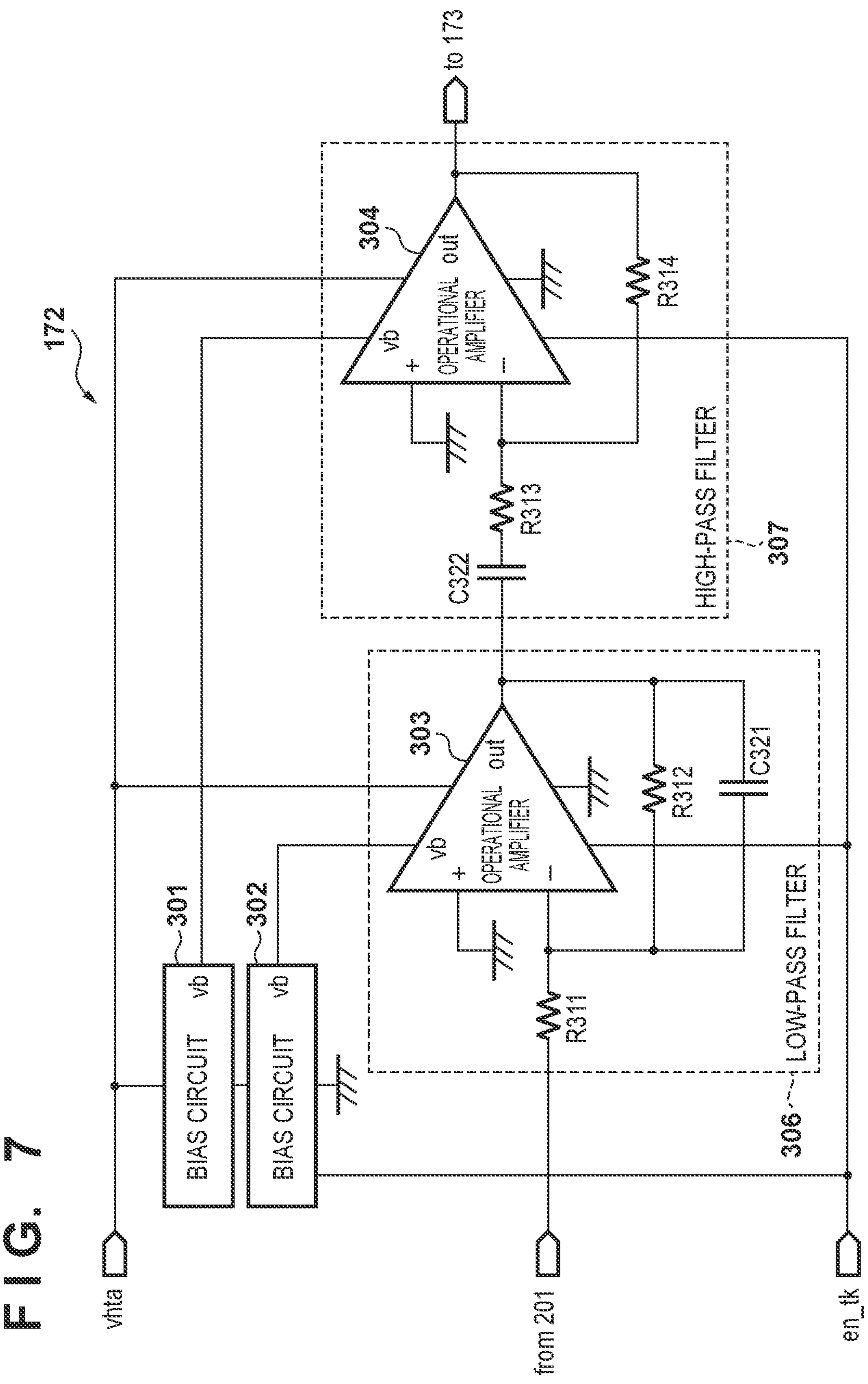
FIG. 7 is an example of a configuration of a band-pass filter circuit 172.

FIG. 7 illustrates an example of a configuration of the BPF 172 of FIG. 3. The BPF 172 includes bias circuits 301 and 302, a low-pass filter 306, and a high-pass filter 307. The low-pass filter 306 includes an operational amplifier 303, resistive elements R311 and R312, and a capacitive element C321. The high-pass filter 307 includes an operational amplifier 304, resistive elements R313 and R314, and a capacitive element C322.

A bias voltage Vb generated by the bias circuit 301 is supplied to the operational amplifier 304. A bias voltage Vb generated by the bias circuit 302 is supplied to the operational amplifier 303. Further, the enable signal (en_tk) is inputted to the bias circuits 301 and 302 and the operational amplifiers 303 and 304. Assume that circuit configurations of the bias circuits 301 and 302 are similar to that of the bias circuit 202 of FIG. 6B, and circuit configurations of the operational amplifier 303 and 304 are similar to that of the operational amplifier 201 of FIG. 6B.

According to this configuration, it is possible, also in the BPF 172, to control a stopped state/operating state by an L level/H level of the enable signal (en_tk) while a power supply voltage of the power supply vhta is being supplied.

Figure 8A:
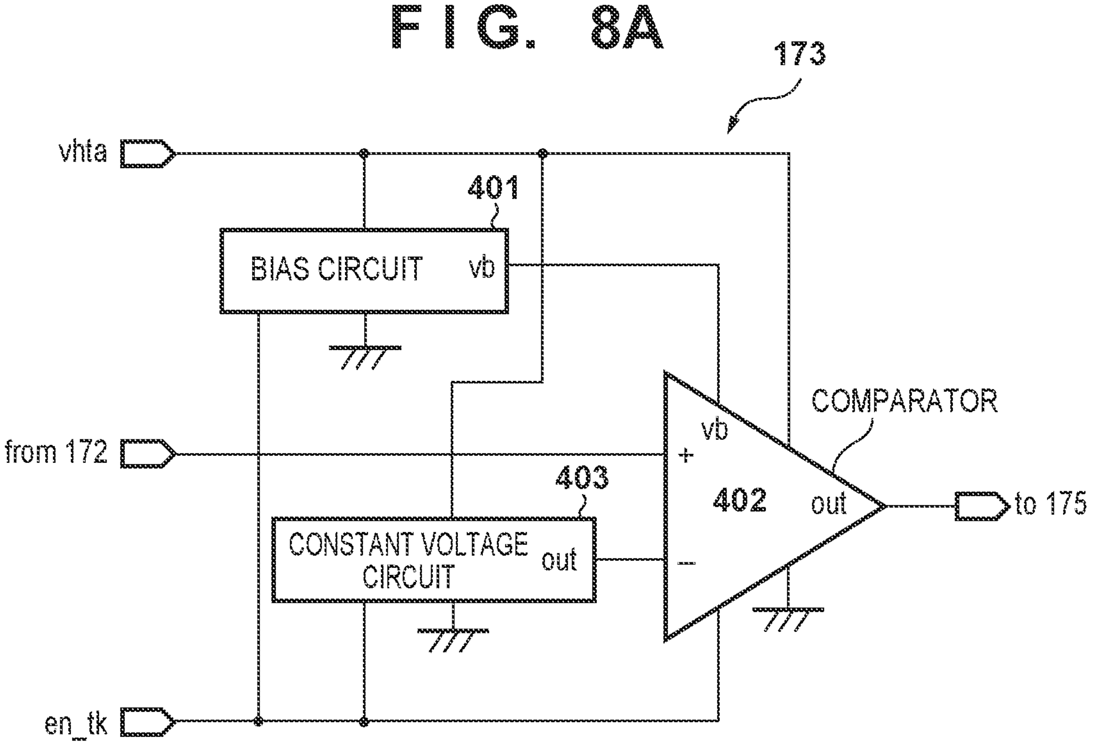
FIG. 8A is an example of a configuration of a comparator circuit 173.

FIG. 8A illustrates an example of a configuration of the CMP 173 of FIG. 3. The CMP 173 includes a bias circuit 401, a comparator 402 and a constant voltage circuit 403. The enable signal (en_tk) is inputted to the bias circuit 401, the comparator 402, and the constant voltage circuit 403. A bias voltage Vb generated by the bias circuit 401 is supplied to the comparator 402. The comparator 402 compares a voltage generated by the constant voltage circuit 403 with the voltage received from the BPF 172 and outputs that result. Assume that a circuit configuration of the bias circuit 401 is similar to that of the bias circuit 202 of FIG. 6B, and a circuit configuration of the comparator 402 is similar to that of the operational amplifier 201.

Figure 8B:
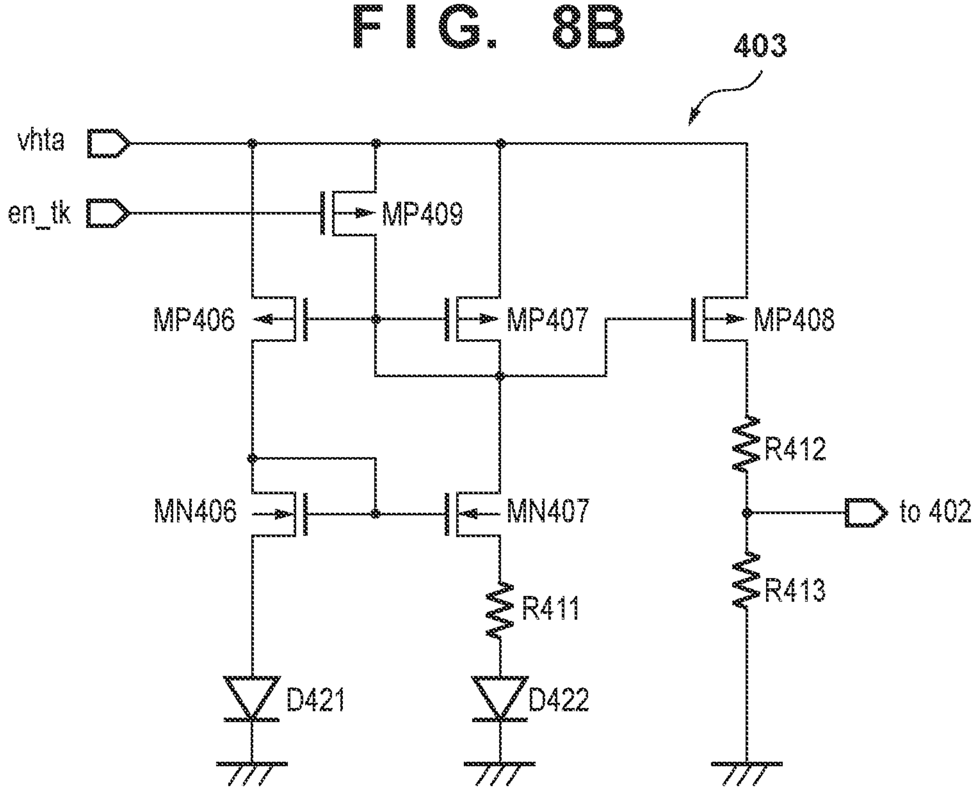
FIG. 8B is an example of a configuration of a constant voltage circuit 403.

FIG. 8B illustrates an example of a configuration of the constant voltage circuit 403 of FIG. 8A. D421 and D422 in the drawing indicate diodes. Gates of transistors MP406, MP407, and MP408 are connected to a drain of a transistor MP409, and the power supply vhta is connected to a source of the transistor MP409. When an L level enable signal (en_tk) is inputted, the transistor MP409 enters an on state. Thus, the transistors MP406 to MP408 enter an off state by an H level (a power supply voltage of the power supply vhta) being inputted to their gates. Thus, the constant voltage circuit 403 enters a non-operating state, and thereby, the current supply from the power supply vhta is suppressed.

According to this configuration, it is possible, also in the CMP 173, to control a stopped state/operating state by an L level/H level of the enable signal (en_tk) while a power supply voltage of the power supply vhta is being supplied.

Figure 9:
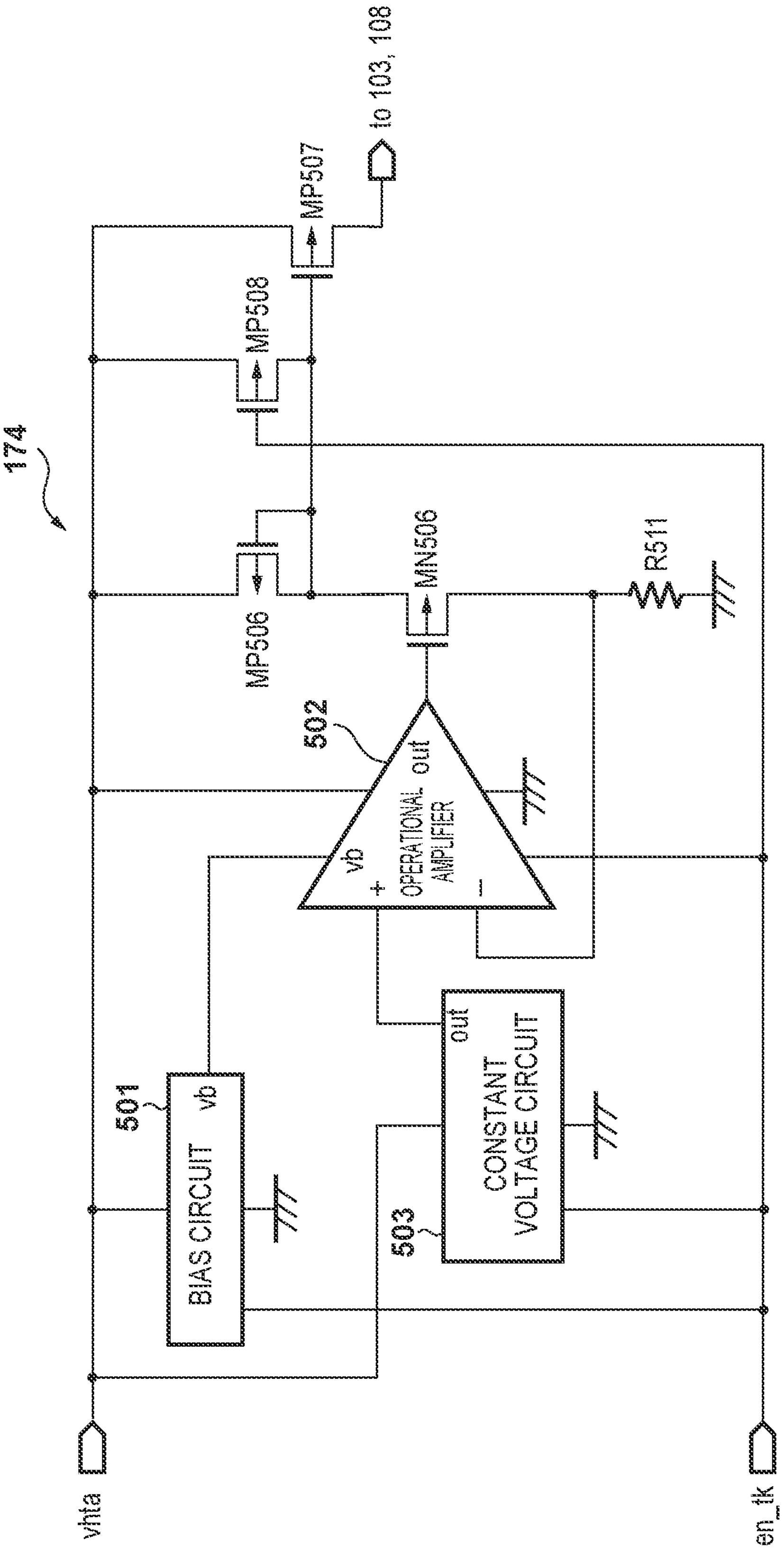
FIG. 9 is an example of a configuration of a constant current circuit 174.

FIG. 9 illustrates an example of a configuration of the constant current circuit 174 of FIG. 3. The constant current circuit 174 includes a bias circuit 501, an operational amplifier 502, a constant voltage circuit 503, a resistive element R511, and transistors MN506, MP506, MP507, and MP508. Assume that the constant current circuit 187 of the digital temperature detection circuit unit 180 also includes the constant current circuit 174 of a similar configuration.

A bias voltage Vb generated by the bias circuit 501 is supplied to the operational amplifier 502. The operational amplifier 502 receives a voltage generated by the constant voltage circuit 503 at one input terminal (−), the other input terminal (+) is connected to the resistive element R511, and an output terminal is connected to a gate of the transistor MN506. The resistive element R511 is connected with the transistor MN506 so as to form a current path. A current flowing through the resistive element R511 is supplied to the first row discharge detection sensors 103 and the second row discharge detection sensors 108 by a current mirror circuit formed by the transistors MP506 and MP507. The enable signal (en_tk) is inputted to the bias circuit 501, the operational amplifier 502, and the constant voltage circuit 503. The enable signal (en_tk) is also inputted to a gate of the transistor MP508. Assume that a circuit configuration of the bias circuit 501 is similar to that of the bias circuit 202 of FIG. 6B, a circuit configuration of the operational amplifier 502 is similar to that of the operational amplifier 201 of FIG. 6B, and the constant voltage circuit 503 is similar to the constant voltage circuit 403 of FIG. 8B.

According to this configuration, it is possible, also in the constant current circuit 174, to control a stopped state/operating state by an L level/H level of the enable signal (en_tk) while a power supply voltage of the power supply vhta is being supplied.

Figure 10:
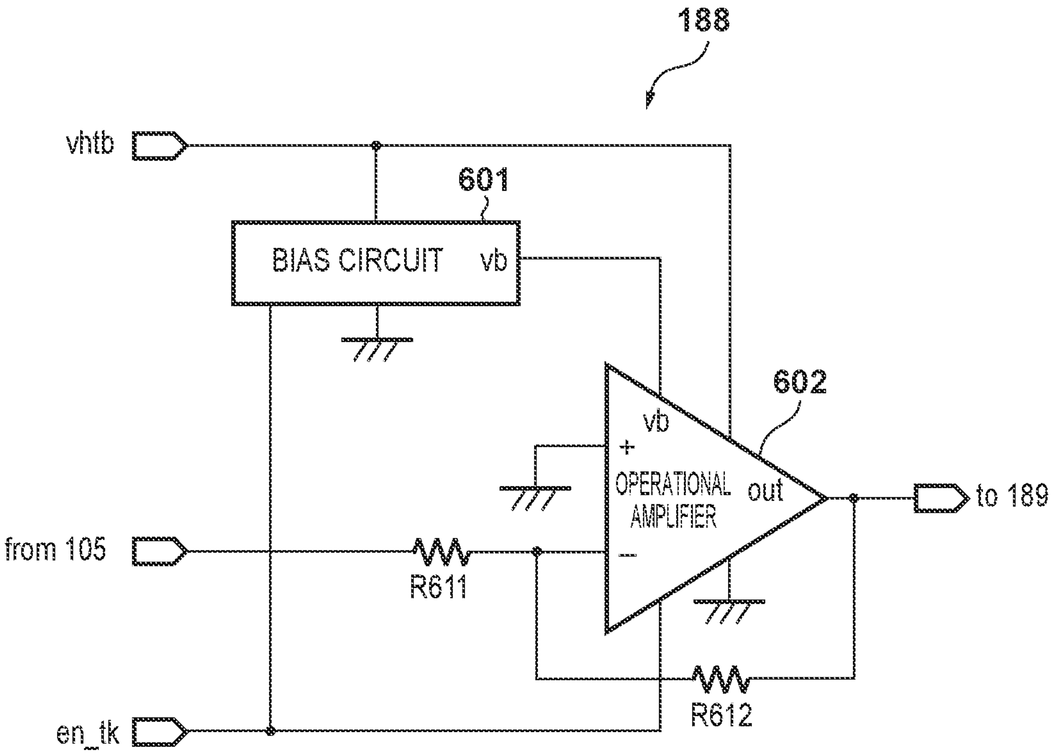
FIG. 10 is an example of a configuration of a buffer circuit 188.

FIG. 10 illustrates an example of a configuration of the BUF 188 of FIG. 3. The BUF 188 includes a bias circuit 601, an operational amplifier 602, and resistive elements R611 and R612. A bias voltage Vb generated by the bias circuit 601 is supplied to the operational amplifier 602. A voltage (monitor voltage) inputted from the group of diodes 105 is amplified by the operational amplifier 602 based on a resistance ratio of the resistance elements R611 and R612 and is outputted to the ADC 189. A power supply voltage of the power supply vhtb is supplied and the enable signal (en_ad) is inputted to the bias circuit 601 and the operational amplifier 602. Assume that a circuit configuration of the bias circuit 601 is similar to that of the bias circuit 202 of FIG.

6B, and a circuit configuration of the operational amplifier 602 is similar to that of the operational amplifier 201 of FIG. 6B.

According to this configuration, it is possible, also in the BUF 188, to control a stopped state/operating state by an L level/H level of the enable signal (en_ad), with a power supply voltage of the power supply vhtb.

Figure 11:
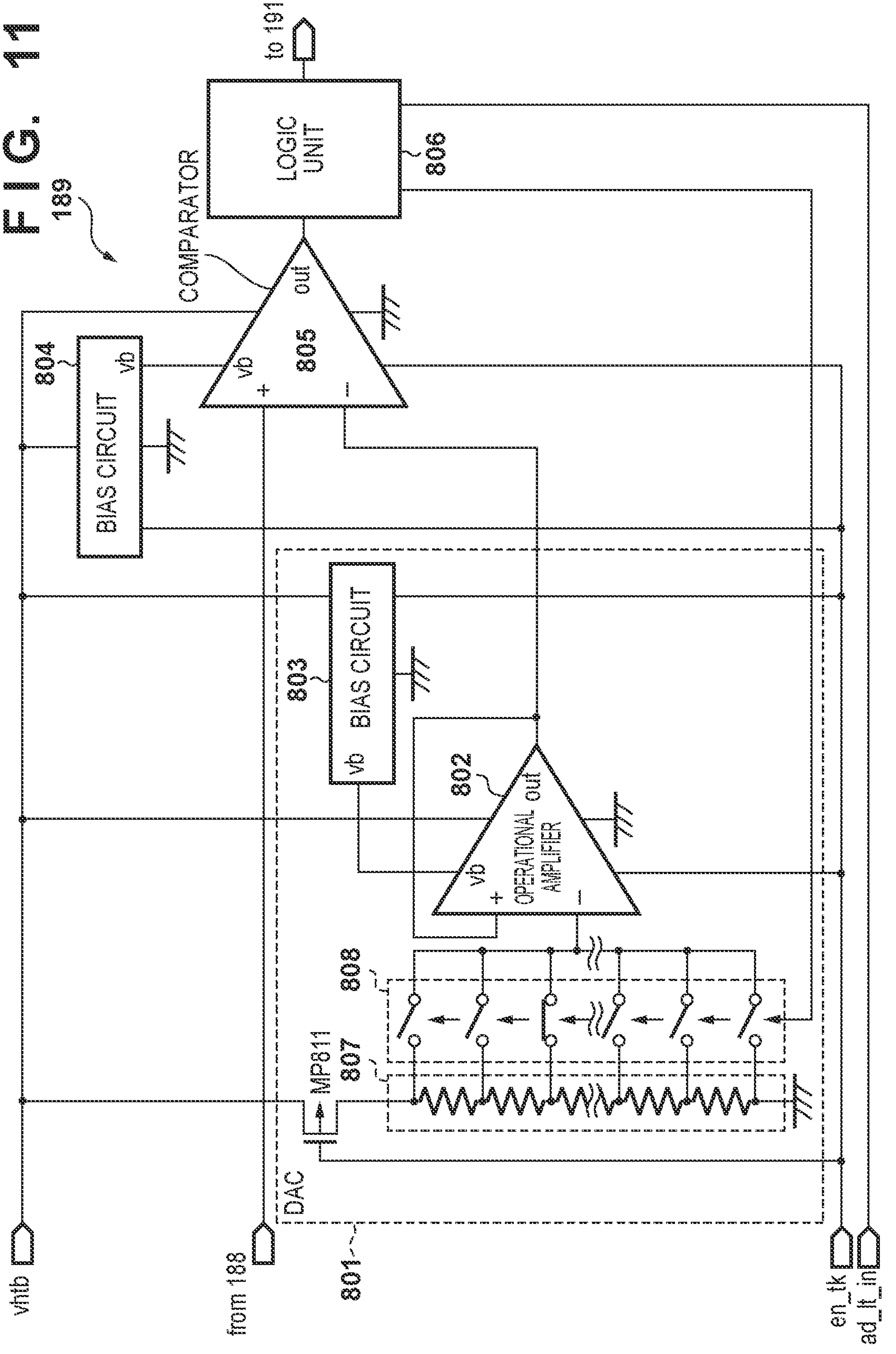
FIG. 11 is an example of a configuration of an analog-to-digital converter 189.

FIG. 11 illustrates an example of a configuration of the ADC 189 of FIG. 3. The ADC 189 includes a digital-to-analog converter (DAC) 801, a bias circuit 804, a comparator 805 and a logic unit 806. The DAC 801 includes an operational amplifier 802, a bias circuit 803, a transistor MP811, an array of resistive elements 807 and a selection circuit 808.

The array of resistive elements 807 is connected in series with the transistor MP811 and includes a plurality of resistive elements connected in series. The selection circuit 808 includes a plurality of switch elements corresponding to a plurality of resistive elements of the resistive element array 807, and by their on-state/off state being controlled by the logic unit 806, a desired voltage is inputted to one input terminal (+) of the operational amplifier 802. An output terminal of the operational amplifier 802 is connected to the other input terminal (−) and is connected to one input terminal (−) of the comparator 805. The comparator 805 outputs to the logic unit 806 a result of comparison with a signal from the BUF 188 received at the other input terminal (+).

The logic unit 806 outputs as a signal indicating a result of the analog-to-digital conversion of the signal from the BUF 188 a signal from the comparator 805 to the output buffer 191 based on a signal (ad_lt_in). In this way, the ADC 189 converts the signal from the BUF 188 from analog to digital and outputs a result of the conversion via the output buffer 191.

A bias voltage Vb generated by the bias circuit 803 is supplied to the operational amplifier 802. A bias voltage Vb generated by the bias circuit 804 is supplied to the comparator 805. A power supply voltage of the power supply vhtb is supplied and the enable signal (en_tk) is inputted to the operational amplifier 802, the bias circuit 803, the bias circuit 804 and the comparator 805. When an L level enable signal (en_tk) is inputted, the transistor MP811 enters an on state. When the enable signal (en_tk) enters an H level, and thereby the transistor MP811 enters an off state, the current supply of the power supply vhtb to the array of resistive elements 807 is prevented. Assume that circuit configurations of the bias circuit 803 and the bias circuit 804 are similar to that of the bias circuit 202 of FIG. 6B, and circuit configurations of the operational amplifier 802 and the comparator 805 are similar to that of the operational amplifier 201 of FIG. 6B.

According to this configuration, it is possible, also in the ADC 189, to control a stopped state/operating state by an L level/H level of the enable signal (en_ad) while a power supply voltage of the power supply vhtb is being supplied.

According to the above-described circuit configurations, current supply to the discharge detection circuit unit 170 and the digital temperature detection circuit unit 180 can be controlled based on flag7 and flag6 set in the communication data 147. Therefore, according to the present embodiment, it is not necessary to install in the head substrate 100 a dedicated electrode for controlling current supply. In addition, reduction of the number of electrodes may also be advantageous for downsizing the head substrate 100 and the inkjet printhead that includes the head substrate 100 as well as for downsizing their wiring (e.g., wires, flexible cables, etc.) or for reducing the number of wires. Therefore, according to the present embodiment, it is possible to realize reduction of power consumption of the head substrate 100 with a relatively simple configuration. In the present embodiment, the discharge detection circuit unit 170 and the digital temperature detection circuit unit 180 are given as examples; however, the contents of the present embodiment may be applied to an analog circuit or an analog circuit unit that accessorily or additionally includes another function, and they may be collectively expressed as a functional unit.

Second Embodiment

Figure 13:
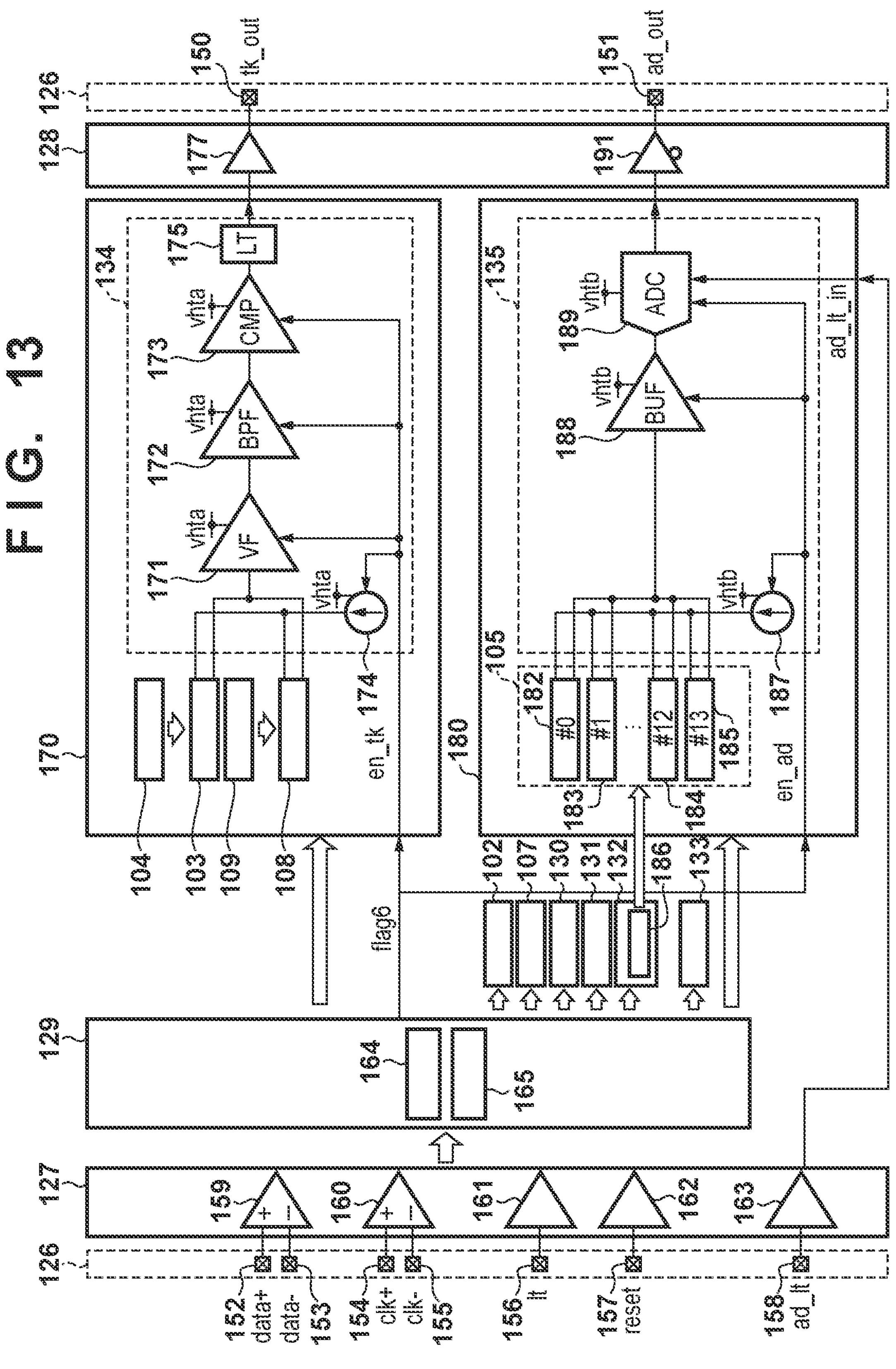
FIG. 13 is a block diagram illustrating another example of a configuration of the head substrate 100.

FIG. 12 illustrates an example of a data format of the flag 137 according to a second embodiment, similarly to FIG. 2B. Further, FIG. 13 illustrates details of an example of a configuration of the head substrate 100 according to the present embodiment, similarly to FIG. 3.

In the present embodiment, execution of discharge detection and execution of digital temperature detection are collectively set in flag6, which is bit #6 of the flag 137. That is, flag6 corresponds to the enable signal (en_tk) and the enable signal (en_ad) of the discharge detection circuit unit 170 and the digital temperature detection circuit 180. Meanwhile, bit #7 can be assigned as flag70 for setting the sub-heater selection 140 to be communication data to not be transmitted and can make the communication data 147 extensible.

According to the present embodiment, the current supply to the discharge detection circuit unit 170 and the digital temperature detection circuit unit 180 can be controlled based on flag6 set in the communication data 147. Therefore, an effect similar to the above-described first embodiment can be obtained by the present embodiment.

Third Embodiment

FIG. 14A illustrates an example of a data format of the flag 137 according to a third embodiment, similarly to FIG. 2B. In addition, FIG. 14B illustrates a portion of a format of the communication data 147 according to the present embodiment, similarly to FIG. 2A.

In the present embodiment, a data format is such that the contents of flag7, which is bit #7 of the flag 137, can be set in the various digital temperature detection settings 145, and the contents of flag6, which is bit #6, can be set in the various discharge detection settings 144. Meanwhile, the bit #7 and bit #6 can be assigned as flag71 and flag61, respectively, for setting the sub-heater selection 140 and the heat pulse setting 139 to be communication data to not be transmitted and can make the communication data 147 extensible.

According to the present embodiment, it is possible to control the supply of current to the discharge detection circuit unit 170 and the digital temperature detection circuit unit 180 using the various discharge detection settings 144 and the various digital temperature detection settings 145. Therefore, an effect similar to the above-described first embodiment can be obtained by the present embodiment.

Fourth Embodiment

Figure 15:
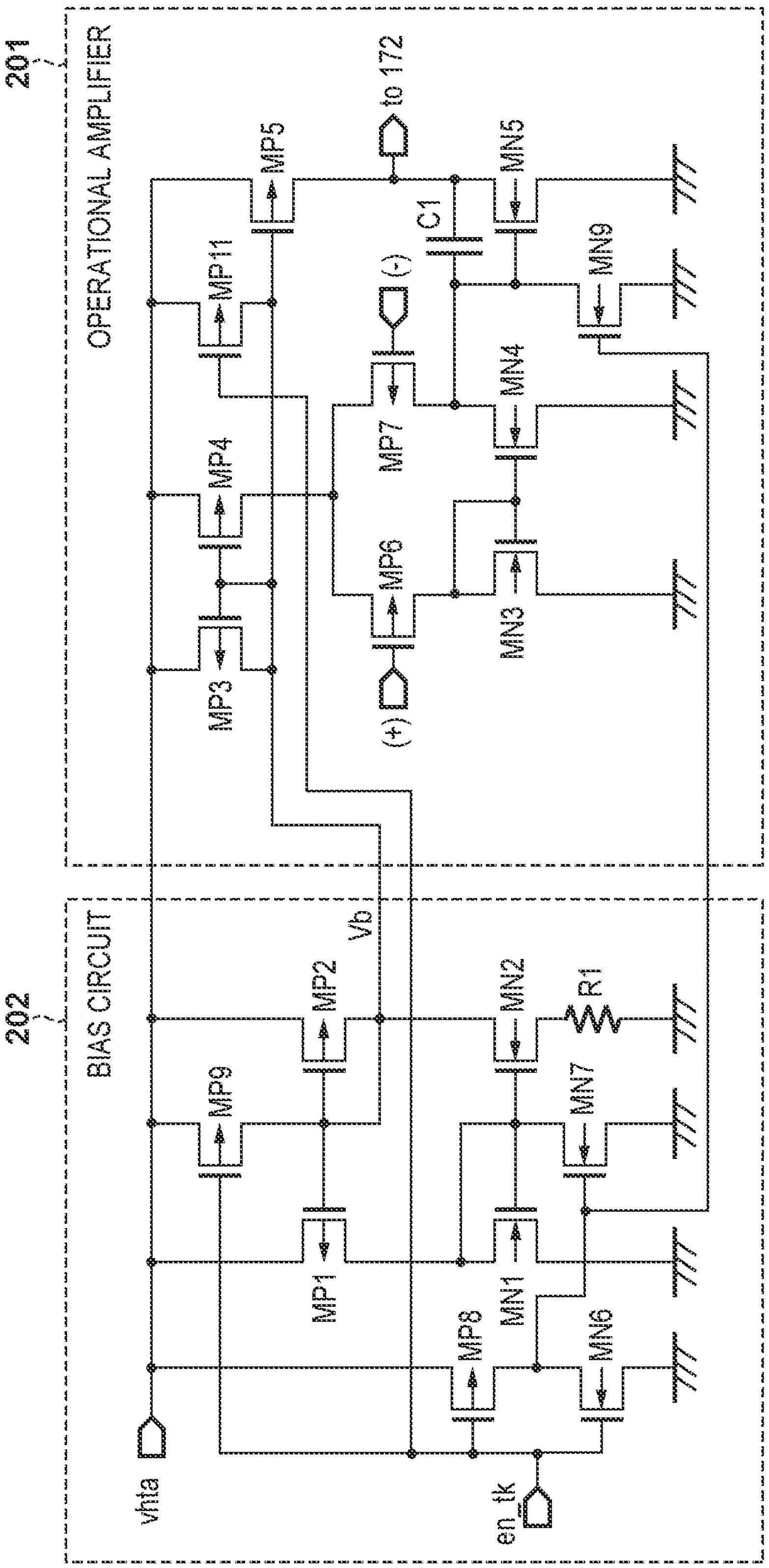
FIG. 15 is an example of configurations of the operational amplifier 201 and the bias circuit 202.

FIG. 15 illustrates an example of a detailed configuration of each of the operational amplifier 201 and the bias circuit 202 according to a fourth embodiment. The present embodiment differs from the first to third embodiments in that rather than the configuration in which an inverted signal of the enable signal (en_tk) is generated by the operational amplifier 201, an inverted signal generated in the bias circuit 202 is shared. According to such a configuration, it is possible to reduce the circuit unit for generating an inverted signal of the enable signal (en_tk). An effect similar to the above-described first embodiment can be obtained also by the present embodiment.

Application Example

The head substrate 100 illustrated in the above-described embodiments can be provided in an inkjet printhead, and the inkjet printhead can be provided in an inkjet printing apparatus. The inkjet printing apparatus is provided with a conveyance mechanism for conveying a printing medium and performs printing on the printing medium using the inkjet printhead. The inkjet printhead is provided with a plurality of nozzles corresponding to the plurality of heaters of the heaters 101 and 106, and the above-mentioned printing can be realized by the individual heaters being energized and driven such that ink is discharged from the corresponding nozzles. The inkjet printhead may be a serial head that is scanned in a direction substantially intersecting a conveyance direction of the printing medium or may be a line head that is extended over a width direction of the printing medium.

OTHER EMBODIMENTS

The individual circuit units or elements illustrated in the above-described embodiments may be modified within a scope that does not depart from the spirit thereof. For example, some functions of one circuit unit may be provided in another circuit unit, or a given circuit unit may further include another element to provide another function different from a main function or a sub function. Further, the number of a plurality of units or elements provided in a circuit unit may be modified.

In the above description, a description has been given using a printing apparatus in which an inkjet printing method is used as an example; however, the printing method is not limited to the above-described form. In addition, the printing apparatus may be a single function printer having only a printing function or may be a multi-function printer having a plurality of functions, such as a printing function, a FAX function, and a scanning function. Further, for example, the apparatus may be a manufacturing apparatus for manufacturing a color filter, an electronic device, an optical device, a microstructure, or the like with a predetermined printing method.

In addition, a term "printing" in the present specification should be broadly interpreted. Therefore, regarding a form of "printing", it does not matter whether a target to be formed on a printing medium is meaningful information, such as a character and a shape, and it also does not matter whether the target manifests so as to be visually perceivable by a human.

In addition, similarly to the above-mentioned "printing", a "printing medium" should be broadly interpreted. Thus, a concept of the "printing medium" may include any material capable of receiving ink, such as commonly used paper as well as cloth, plastic film, metal plate, glass, ceramic, resin, wood, and leather.

Furthermore, similarly to the above-mentioned "printing", "ink" should be broadly interpreted. Accordingly, a concept of "ink" may include liquids that are applied to the printing medium to form an image, a design, a pattern, and the like as well as additional liquids that may be supplied in processing of the printing medium, processing of ink (e.g., solidification or insolubilization of a colorant in the ink applied to the printing medium), and the like. In this regard, the inkjet printhead may be expressed as a liquid discharge head, a discharge head, or simply a head. For similar purposes, the printing apparatus may be expressed as a liquid discharge apparatus and the like; the head substrate may be expressed as an inkjet printhead substrate, a liquid discharge head substrate, and the like; and the heaters may be expressed as printing elements, liquid discharge elements, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-096750, filed on Jun. 15, 2022, which is hereby incorporated by reference herein in its entirety.

What is claimed is:

1. A head substrate including a liquid discharge element for discharging a liquid, the head substrate comprising:

a functional unit configured to realize a discharge detection function that detects that the liquid is discharged, and a digital temperature detection function that detects a temperature of the head substrate; and a communication input unit to which communication data is to be inputted, wherein the communication data includes a bit for not transmitting data for setting the discharge detection function, a bit for not transmitting data for setting the digital temperature detection function, a first portion for setting a function of the functional unit, and a second portion for controlling a supply of current to the functional unit.

2. The head substrate according to claim 1, wherein the functional unit includes a sensor for realizing the discharge detection function.

3. The head substrate according to claim 2, wherein the sensor is one of a plurality of sensors and the first portion is data for setting a sensor to be selected from the plurality of sensors.

4. The head substrate according to claim 1, wherein the functional unit includes a diode for realizing the digital temperature detection function.

5. The head substrate according to claim 4, wherein the diode is one of a plurality of diodes and the first portion is data for setting a diode to be selected from the plurality of diodes.

6. The head substrate according to claim 1, wherein the functional unit is configured to be capable of receiving an enable signal, and when the enable signal is one signal level, a current is supplied to the functional unit, and when the enable signal is another signal level, a supply of current to the functional unit is suppressed.

7. The head substrate according to claim 1, further comprising:

a plurality of electrodes including an electrode for receiving the communication data, wherein the liquid discharge element is one of a plurality of liquid discharge elements, and the plurality of electrodes and the plurality of liquid discharge elements are arranged in a side direction of the head substrate, and the functional unit is arranged between the plurality of electrodes and the plurality of liquid discharge elements.

8. A liquid discharge head comprising:

the head substrate according to claim 1; and a nozzle that corresponds to the liquid discharge element of the head substrate.

9. A liquid discharge apparatus comprising:

the liquid discharge head according to claim 8; and a conveyance mechanism configured to convey a printing medium.

* * * * *